Figure 1:
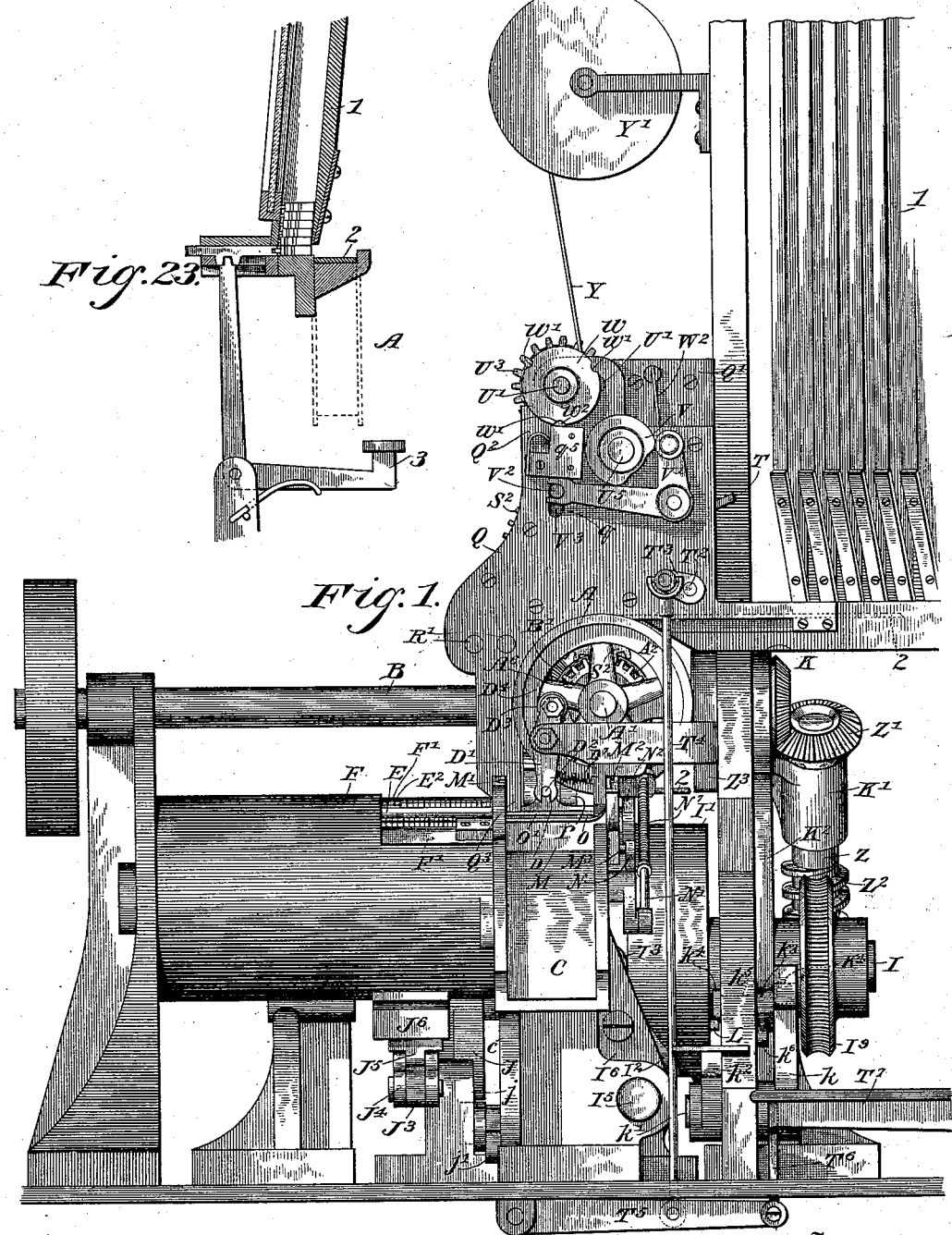

(No Model.) 8 Sheets—Sheet 1.

P. F. COX.
TYPE SETTING AND JUSTIFYING MACHINE.

No. 534,550. Patented Feb. 19, 1895.

Witnesses:
J. M. Witherow.
W. E. Clendaniel.

Inventor,
Paul F. Cox.
By Alexander & Dowell
Attorneys (No Model.) 8 Sheets—Sheet 2.

P. F. COX.
TYPE SETTING AND JUSTIFYING MACHINE.

No. 534,550. Patented Feb. 19, 1895.

Witnesses
J. M. Witherow
W. E. Clendaniel

Inventor
Paul F. Cox.
By Alexander & Dowell
Attorneys (No Model.)  
8 Sheets—Sheet 3.

P. F. COX.
TYPE SETTING AND JUSTIFYING MACHINE.

No. 534,550. Patented Feb. 19, 1895.

Witnesses:  
J. M. Witherow  
W. E. Clendaniel

Inventor,  
Paul F. Cox,  
By Alexander & Dowell  
Attorneys.

(No Model.) 8 Sheets—Sheet 4.
P. F. COX.
TYPE SETTING AND JUSTIFYING MACHINE.
No. 534,550. Patented Feb. 19, 1895.
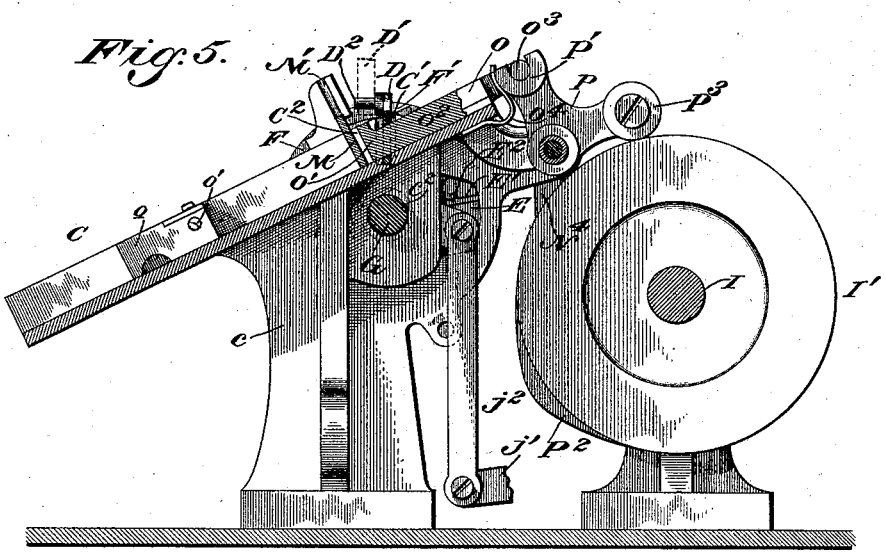
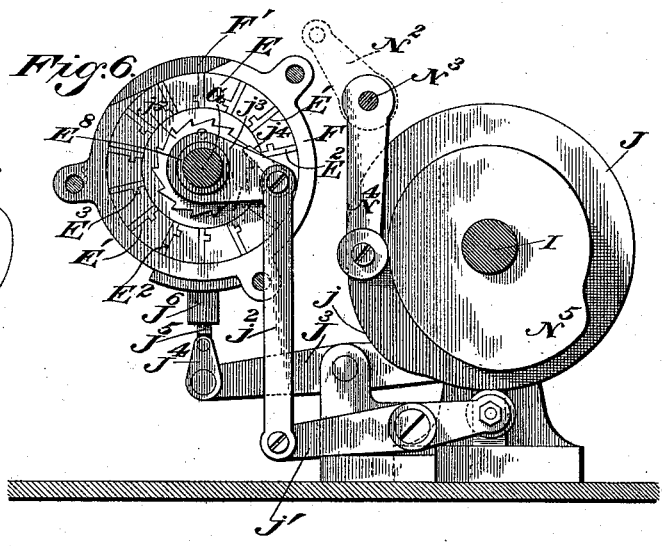
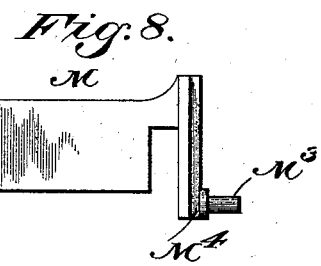
Witnesses
J. M. Witherow
W. E. McDaniel
Inventor
Paul F. Cox
by Alexander & Powell
Attorneys (No Model.) 8 Sheets—Sheet 5.
P. F. COX.
TYPE SETTING AND JUSTIFYING MACHINE.
No. 534,550. Patented Feb. 19, 1895.

Witnesses
J. M. Witherow
W. E. Clendaniel

Inventor
Paul F. Cox.
By Alexander & Dowell
Attorneys.

(No Model.) 8 Sheets—Sheet 6.
P. F. COX.
TYPE SETTING AND JUSTIFYING MACHINE.
No. 534,550. Patented Feb. 19, 1895.
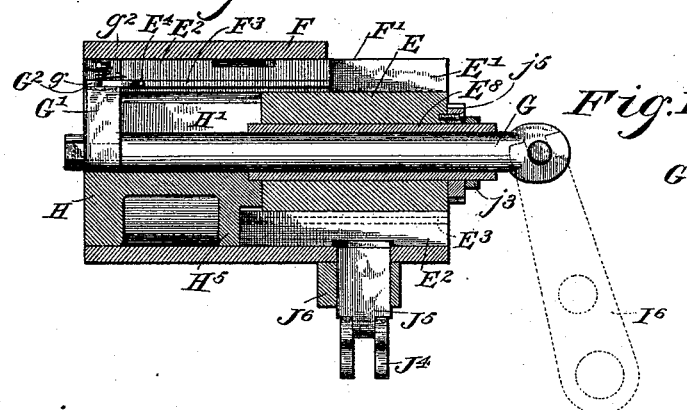
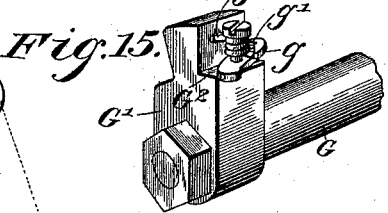
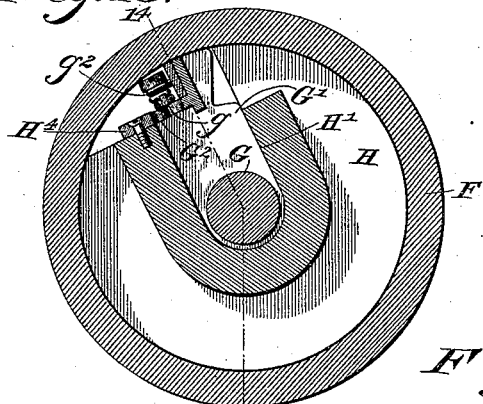
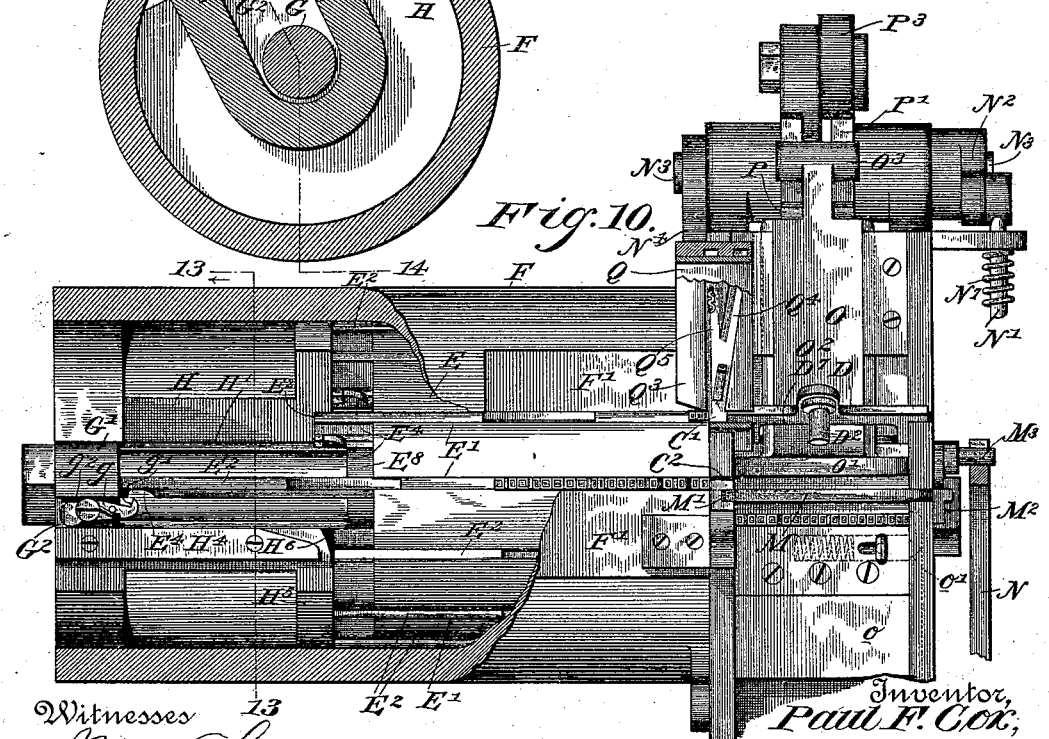
Witnesses
Inventor,
Paul F. Cox,
By Alexander & Dowell
Attorneys

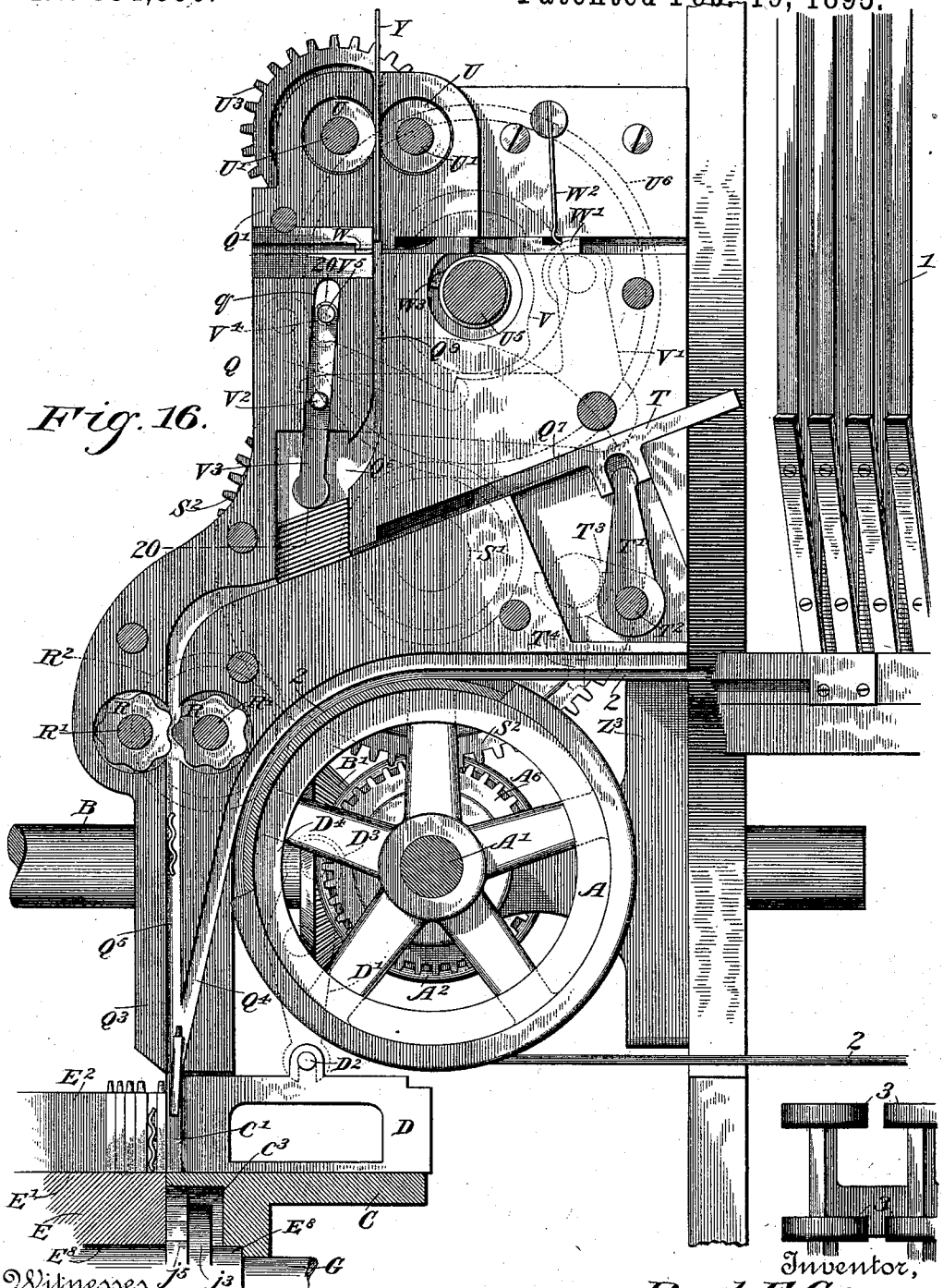

(No Model.)  8 Sheets—Sheet 8.

P. F. COX.
TYPE SETTING AND JUSTIFYING MACHINE.

No. 534,550. Patented Feb. 19, 1895.

Witnesses

Inventor
Paul F. Cox
By
Alexander & Dowell
Attorneys

UNITED STATES PATENT OFFICE.

PAUL F. COX, OF BATTLE CREEK, MICHIGAN, ASSIGNOR TO THE COX TYPE SETTING MACHINE COMPANY, OF CHICAGO, ILLINOIS.

TYPE SETTING AND JUSTIFYING MACHINE.

SPECIFICATION forming part of Letters Patent No. 534,550, dated February 19, 1895.

Application filed October 15, 1894. Serial No. 525,962. (No model.)

*To all whom it may concern:*

Be it known that I, PAUL FLEMMING COX, of Battle Creek, in the county of Calhoun and State of Michigan, have invented certain new and useful Improvements in Automatic Line Making and Justifying Devices for Type-Setting Machines; and I do hereby declare that the following is a full, clear, and exact description thereof, reference being had to the accompanying drawings, and to the letters and numerals of reference marked thereon, which form part of this specification.

This invention is an improvement in type-setting machines, and is especially designed for use with the improved type setting machine shown and described in my Letters Patent on "type setting machine," issued November 6, 1894, No. 528,856; "type justifier," issued November 6, 1894, No. 528,857; and "transmitter and type composer," issued November 6, 1894, No. 528,855.

The main object of this invention is to enable the operator, upon the completion of a line of type, by simply depressing a key to release mechanism by which the composed line of type is automatically shifted out of the way, justified, and moved into the galley, while the operator continues to compose another line; in short to enable one line of type to be set up while a previous line is being automatically taken care of by the mechanism of the machine; thus enabling the operator to continuously "compose," and saving the time hitherto lost in such machines while waiting for a line to be jutified, or taken out of the way.

Minor objects of the invention are, first, to provide novel means by which each line as composed is moved out of the way, and while one line is being composed the preceding line is being automatically forwarded into the galley; second, to provide improved mechanism whereby each line is automatically "justified" as it is moved into the galley; third, to provide novel mechanism for making and automatically maintaining a supply of plain spaces in the machine; and also mechanism for crimping the plain spaces, so as to render them laterally compressible, on their way to the composing channels.

A machine embodying my invention will without the operator doing anything more than "playing" the keys, as in ordinary type-setters, composes the type, align the same, justify the lines, and shift the lines into the galley, the mechanism being controlled by keys which simply release the power mechanisms by which the several steps are accomplished; and in such machine the justifying and shifting of one line of type into the galley may, and does, take place while a succeeding line is being composed. The machine only requires one operator, who when he hears the alarm announcing the completion of a line depresses the "line" key and immediately proceeds with the composing, without waiting upon any justifying or line shifting mechanism to operate, and without exerting any more manual power to shift the "line" key, than he does to shift the "type" keys.

These objects are all practically attained in the improved machine which is herein described and shown in detail, and which is I believe the best form of apparatus now known to me, and hence selected to illustrate my invention, but to which specific construction I do not limit myself, the invention being best summarized in the claims.

Figure 2:
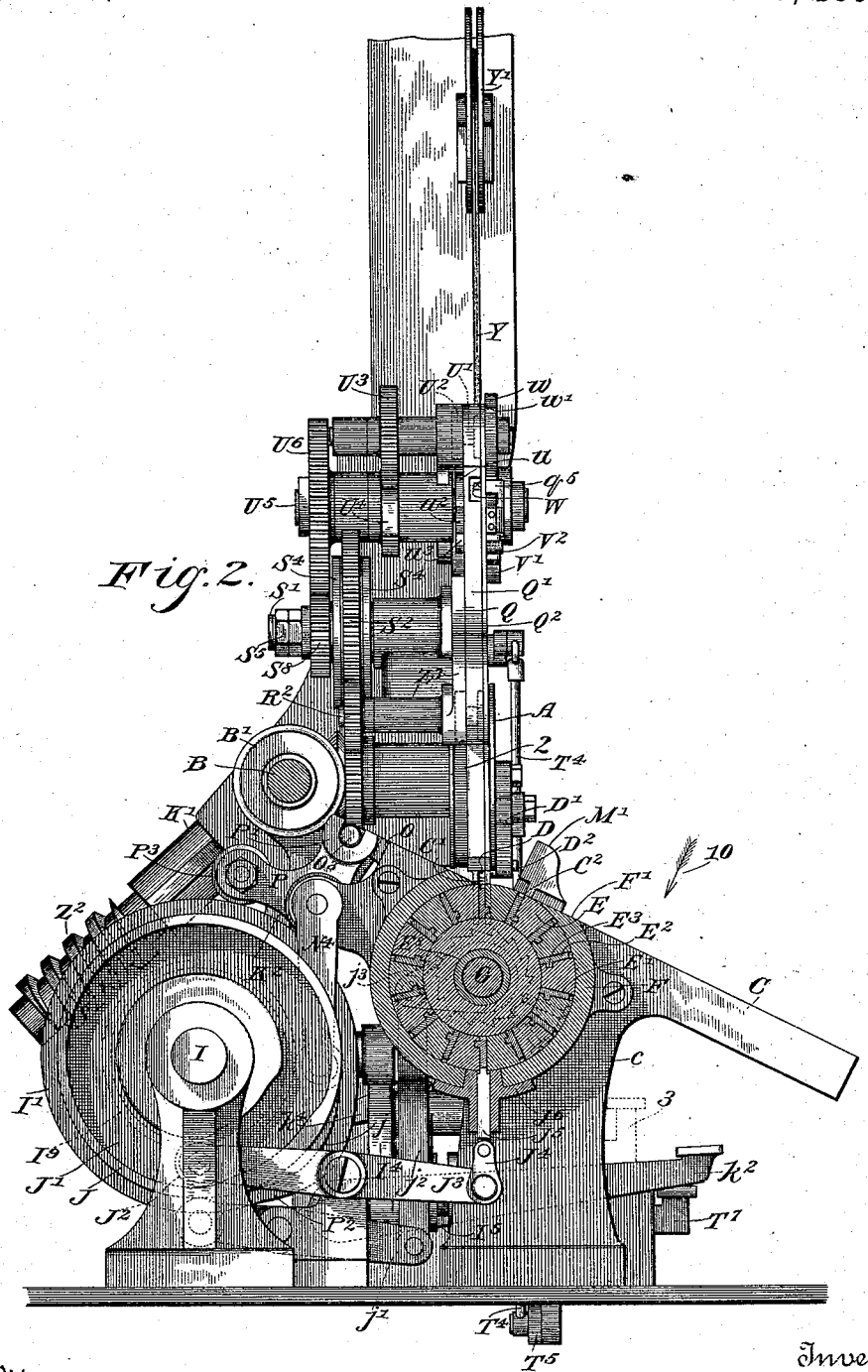
Figure 3:
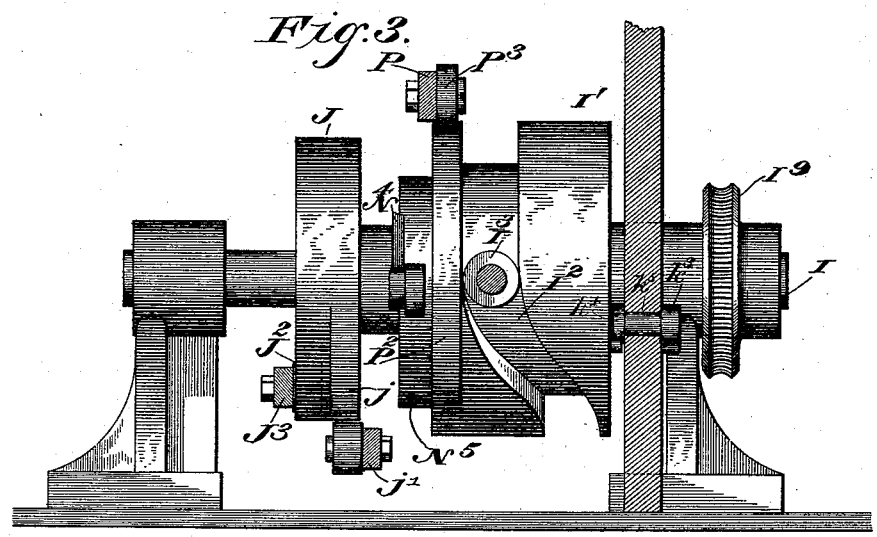
Figure 4:
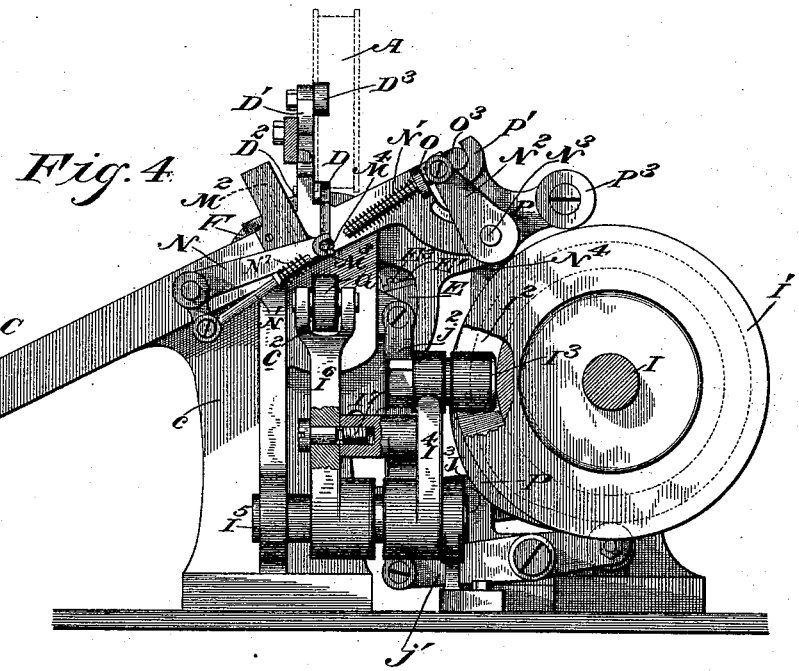
Figure 9:
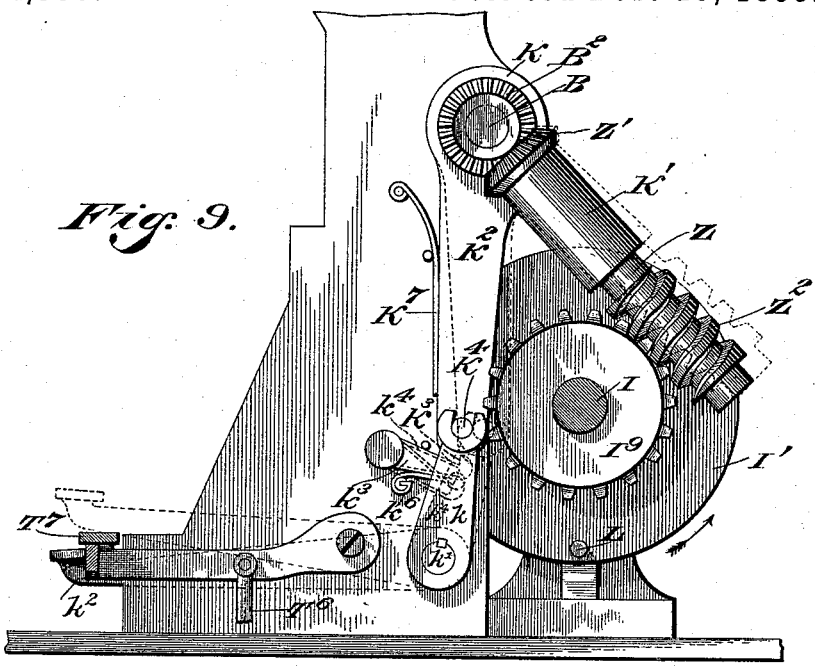
Figure 11:
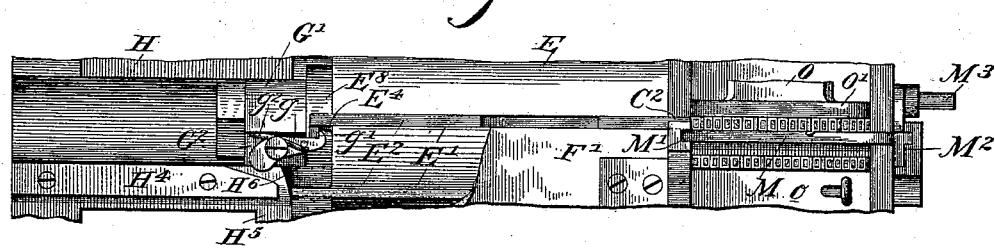
Figure 12:
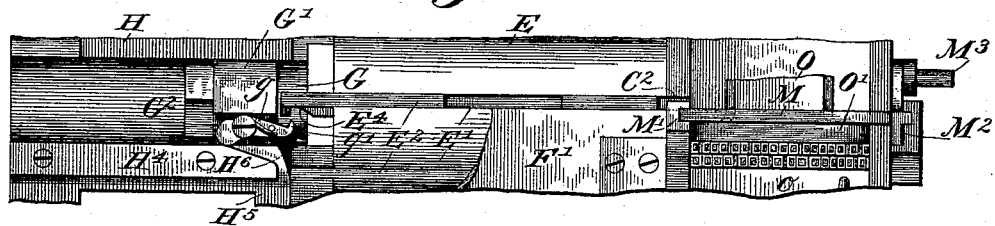
Figure 11:
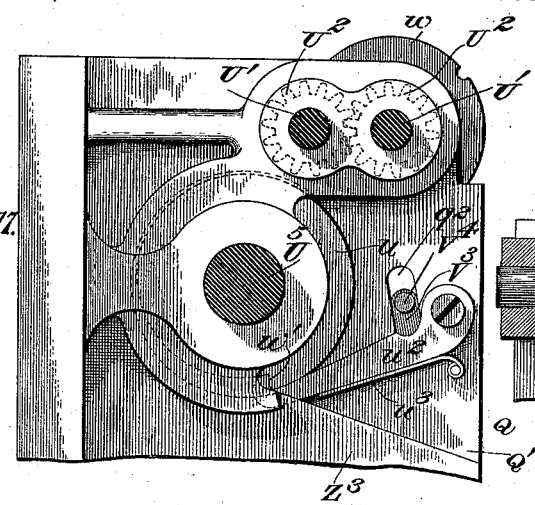
Figure 18:
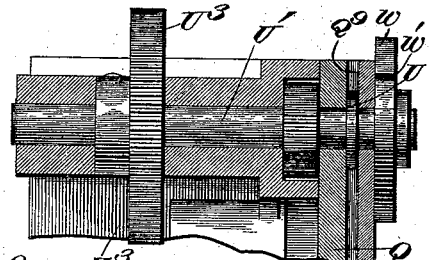
Figure 19:
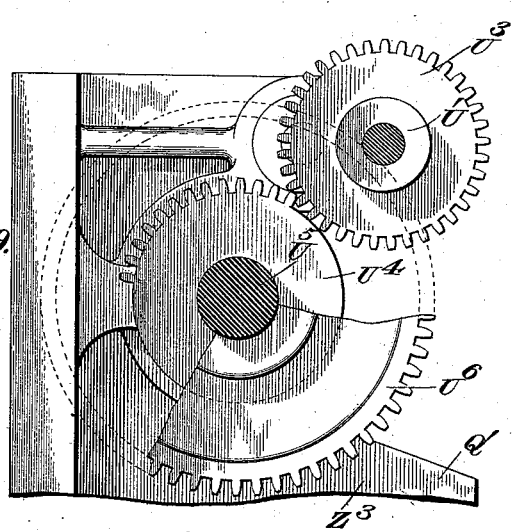
Figure 20:
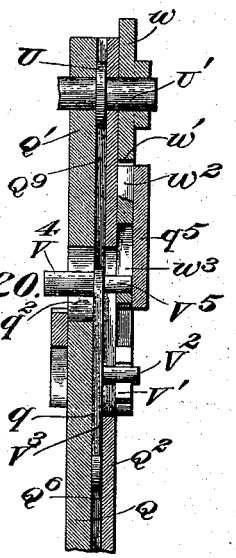
Figure 21:
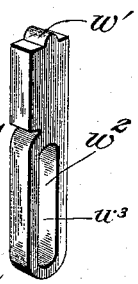
Figure 22:
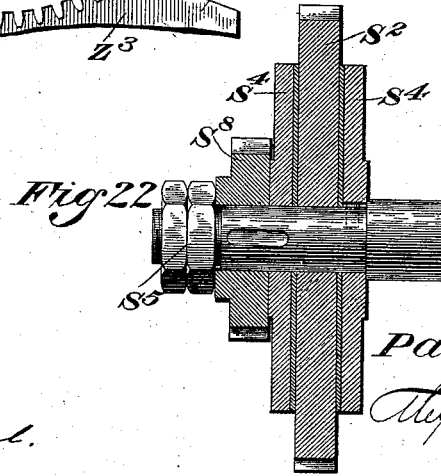

In the accompanying drawings: Figure 1 is a front elevation of the space making and composed-type handling mechanisms embodying my invention attached to a type setting machine. Fig. 2 is an end elevation of the space making mechanism, and a part end view and part transverse section of the type-handling mechanism shown in Fig. 1. Fig. 3 is a front view of the cammed shaft showing the levers operated therefrom in section. Fig. 4 is a right-hand end view, partly in section, of the "composed type" handling mechanisms. Fig. 5 is a vertical longitudinal section through the "galley," and elevation of mechanism for reciprocating the "plunger." Fig. 6 is an end view of the "receiver" and detail view of the mechanism for rotating it; also of part of rule-operating mechanism. Fig. 7 is a detail of the devices for rotating the receiver. Fig. 8 is a detached view of the "rule." Fig. 9 is a right hand end view, in detail, showing the mechanism for throwing the composed-type handling mechanisms into and out of operation. Fig. 10 is a top plan view of the type-handling mechanisms, looking down in the direction of the arrow "10" Fig. 2. Figs. 11 and 12 are detail plan views showing the different positions of the type-ejecting and line-compressing devices. Fig. 13 is a transverse section on line 13—13 Fig. 10. Fig. 14 is a reduced longitudinal section on line 14—14, Fig. 13. Fig. 15 is a detail perspective view of the line-ejecting and compressing "block." Fig. 16 is an enlarged front view of the "space" making and crimping mechanisms, the front plate of the "case" being removed and illustrating by diagram-section the composing devices. Fig. 17 is a detail sectional view of the "locking" devices of the space cutting rolls. Fig. 18 is a detail side view of shaft "U'" and connections. Fig. 19 is a detail sectional view of the "ribbon" feed roll driving gearing. Fig. 20 is a detail sectional view on line 20—20 Fig. 16. Fig. 21 is a detail perspective view of the dog $w'$. Fig. 22 is a vertical section through the friction clutch on shaft S'. Fig. 23 is a detail vertical section of the type-ejecting devices.

Referring to like parts in said drawings by numerals and letters marked thereon, 1 designates a bank of type-channels; 2, an endless type carrier belt upon which the types are ejected; A, one of the grooved wheels upon which said belt runs, and 3 are the type keys.

The foregoing parts and their connections may be constructed like similar parts in my application for type-setting machine above mentioned, and need no further description herein.

Understand that the construction of the means for ejecting and forwarding the types to the composing channels is not part of my present invention, and may be of any desired style; my invention being applicable to almost all known styles of type-setting machines.

The belt wheel A is at the front of the machine and as shown, is near the lower left hand corner of the series of type-channels. Its shaft A' extends to the rear of the channels and has a bevel gear $A^2$ keyed on it meshing with a bevel gear B' on a shaft B, which is journaled in suitable brackets. In the present case the drive shaft of the machine, extends horizontally at right angles to shaft A, and may be driven by any suitable motor.

Below, and in front of wheel A is the galley C which is mounted on a suitable bracket and inclined downward at an angle of about thirty-three degrees. This galley has a vertical transverse slot C' in one side, near its upper end, just below the periphery of wheel A, into which slot the type are dropped, and beside and working into said slot, transversely of the galley, is a "pusher" D by which the types are moved outward away from the galley into the "rotary" composing stick, or type-line receiver E. This "pusher" is reciprocated by an oscillating arm D' which is pivoted upon a suitable bracket in front of wheel A, its lower bifurcated end embracing a pin $D^2$ on the "pusher" and its upper end bearing a roller $D^3$ which bears against the inner periphery of an annular cam $D^4$ on the face of wheel A, the arm being pressed against the cam, and the pusher retracted by means of a spring $D^5$.

The bracket and galley C may be formed of a single casting $c$ as shown, and to such casting just below and at the side adjoining slot C' is attached a cylindrical casing F as shown, in which casing is placed the receiver E, which is also cylindrical, but shorter than the casing, and tubular, and its end next the galley fits over a cylindrical recess $c'$ in the side of casting $c$ as shown. The receiver has a series of longitudinal, parallel, and radial slots E' in it (fourteen being shown) of a width and depth proper to receive a line of aligned type, and in each slot fits a slide $E^2$, that is longitudinally movable and is retained therein by a longitudinal rib $E^3$ fitting a corresponding recess in one side of the slot. The receiver E is so placed in casing F, that the uppermost slot E' in the receiver will coincide with the slot C' in the side of the galley and therefore the types, moved out of slot C' by pusher D will enter such slot E' pushing before them the slide $E^2$. A rod G passes axially through receiver E, and one end projects through an opening $c^2$ in casting $c$ beneath the galley, while on its other end, within casing F, is a block G' which is reciprocated as hereinafter described for the purpose of "justifying" and ejecting the complete line of type from a slot E' at the proper time. This block is supported and guided in a radial groove H' in a casting H placed within the casing F next the receiver as shown.

The receiver E may be supported on rod G, but in order to prevent wear on the rod and lessen friction, I prefer to mount it on a steel tube $E^8$, which partly surrounds rod G, one end being supported in the opening $c^2$, and the other in block H, as shown. This allows the receiver to be rotated without frictional contact with the rod G or the casing F.

Below slot C' in the side of the galley is a second slot $C^2$ with which slots E' register successively, immediately after they pass out of register with slot C'.

The casing F is cut-away at F' so that the two slots E' registering with slots C' $C^2$ respectively will be always visible to the operator.

In practice the types are delivered successively into slot C' in front of pusher D, and are moved by the latter into the slot E' of the receiver registering with slot C' (the receiver being so shifted that all its slots E' are successively brought into register with slots C' $C^2$). As the types enter slot E' the slide $E^2$ is pushed out into the casing F, over the groove H' in casting H, and as soon as the line of type is complete the receiver is turned so that the type-filled slot E' registers with slot $C^2$ and another type receiving slot E' is brought to register with slot C'. Then while the type are being pushed into the latter slot, the rod G, is pulled outward and block G' catches the rear end of the projecting slide E² and moves the same toward the galley, thereby forcing the line of type out of the channel E' through slot C² into the galley C. In order to get the line of type clear into the galley the end of slide E² has to pass into slot C². Hence the receiver would be locked by such slide unless some means were provided for retracting it. This is effected by means of a dog $g$ which is pivoted in a horizontal position on a shoulder G² of block G and projects beyond the front face of said block to and slightly beyond the rear end of the slide, when the block is pushing the latter outward. The dog has a tooth $g'$ which is adapted to engage with a notch E⁴ in the rib E³ of the slide when the latter is pushed fully outward. It should be noted here that the slides are slightly longer than the channels E' and project about a half inch beyond the inner end of the receiver, when their front ends are flush with the front end thereof. The dog is kept out of engagement with the slide however by a cam piece H⁴ on the top of casting H at one side of groove H', until the line of type is almost entirely moved into the galley. Then it engages the notch E⁴ and when the block G' is moved back the dog drags the slide E² backward also until its front end is clear of slot C², when the rear end of dog $g$ strikes cam H⁴ and it is forced to release the slide, which stops while the block G and dog $g$ travel back to starting point.

The dog $g$ is thrown in engagement with the slide by a spring $g^2$ when freed from cam H⁴. As the receiver rotates the inner ends of the slides, if drawn too far inward, contact with a cam surface H⁶ on one end of a flange H⁵ on casting H by which they are moved outward so that the channels E' are completely filled by the slides when they arrive at the slot C' as the flange H⁵ prevents their casual displacement in the channels.

The means for locking and rotating the receiver, and for shifting the rod G, are as follows: Behind the casing F parallel with but below the shaft B and journaled in suitable supports is a shaft I, upon which is mounted a cam wheel I' having a peripheral "drunken-cam" groove I² which is engaged by a cam-roller I³ on the end of short lever I⁴ fixed to a stub shaft I⁵ journaled below the galley and transverse to shaft I, and on said shaft I⁵ is pivoted an arm I⁶ the upper end of which is pivotally connected to the outer end of rod G, so that the oscillation of shaft I⁵ imparts a reciprocating movement to said rod. I prefer to connect lever I⁴ to arm I⁶ by a break-pin or screw I⁷, as shown, so that if for any reason the line of type should be clogged or overlong, the pin will break without damage to other parts of the machine and can be replaced by the operator without requiring a skilled mechanic to adjust the parts. On the shaft I is also secured a cam wheel J, having a cam groove J' in its outer face in which runs a roller J² on one end of an oscillating lever J³, which is pivoted near its center on a suitable support at one side the shaft, its outer end underlying casing F, and being connected by a link J⁴ with a locking pin J⁵ that plays through a guide J⁶ on the bottom of the casing F and is adapted to engage with one of the slots E' in the receiver E, and prevent rotation of the receiver until the locking pin is positively disengaged by the cam.

On the periphery of cam wheel J is a short cam wheel $j$ which at the proper time depresses the rear end of an oscillating lever $j'$ to the front end of which is attached a rod $j^2$ which is connected at top to a rocking arm $j^3$ loosely pivoted on the outer end of the sleeve E⁸ beside the outer end of the receiver E, and carrying a dog $j^4$ which engages with a ratchet $j^5$ secured to the outer end of the receiver E, as shown, so that when the forward end of lever $j'$ is raised the receiver will be turned one-fourteenth of a revolution, or sufficiently to bring a fresh slot E² into register with slot C' and the type filled slot E' into register with slot C². The arm $j^3$ and ratchet $j^5$ may be concealed in a recess $c^3$ in casting $c$.

Shaft I is given one complete rotation, at the will of the operator, by the following mechanism: A sleeve K is hung on the inner end of shaft B next gear B', and to said sleeve, but at right angles thereto, is attached a second sleeve K' in which is journaled a stub-shaft Z on one end of which is a bevel gear Z' meshing with a similar gear B² on the end of shaft B. The shaft Z is thus rotated from shaft B, and at the same time can be swung laterally in relation to said shaft. Its swinging movement is however limited as hereinafter described. On the lower end of shaft Z is a worm Z² which is adapted to mesh with a worm gear I⁹ on shaft I, as shown. From sleeve K depends an arm K² having a tooth K³ on its end and a lateral pin K⁴ as shown, which pin is engaged by the bifurcated upper end of a lever $k$ which is fastened to a rock shaft $k'$ journaled in a suitable support to which rock shaft is connected the inner end of a key-lever $k^2$ which projects beside the end of the key-board of the machine as shown, and when the key lever is depressed the worm is thrown into engagement with wheel I⁹. In order to hold the worm in engagement with I⁹ until the shaft I has made a complete revolution without the necessity of holding down lever $k^2$ by hand, a catch $k^3$ is pivoted to a stub shaft $k^5$ journaled in a suitable support above stub shaft $k'$, in position to engage the tooth K³ when arm K² is swung forward. Catch $k^3$ may be pressed upward by a spring $k^6$ as shown. Spring K⁷ is arranged to force arm K² rearward, thereby throwing the worm out of engagement with wheel I⁹ when the catch $k^3$ is disengaged from arm K². This disengagement is effected at each complete revolution of shaft I by means of a pin L on the outer end of cam I', which pin contacts with an arm $k^4$ on the stub shaft $k^5$ and depresses it so that catch $k^3$ is disengaged from arm $K^2$. As soon as the catch is disengaged arm $K^2$ is swung backward by the spring, and the worm disengaged from wheel $I^9$. Consequently shaft I ceases to rotate, until the worm is again thrown into engagement with the wheel $I^9$ by the depression of lever $k^2$. The worm however continually rotates, so long as the shaft B rotates, whether in or out of engagement with wheel $I^9$.

M designates a rule which lies transversely of the galley C just beside the lower edge of slot $C^2$, said rule being guided in grooved ways $M'$ $M^2$, on the sides of the galley. The rule can be lifted clear of a line of type by means of the bell crank N, the longer arm of which is bifurcated and embraces a pin $M^3$ on a depending part $M^4$ of the rule outside the galley, and the short arm of the bell crank is connected by a rod $N'$ to one end of an arm $N^2$ on a rock shaft $N^3$ journaled in a suitable support behind and below the upper end of galley, said shaft being provided with another depending arm $N^4$ on whose lower end is a friction roller bearing against the periphery of a cam disk $N^5$ on shaft I, which cam is adapted to cause the rule to be raised immediately after a fresh line of type has been pushed laterally into the galley, and keep it raised, momentarily, while the plunger O moves the line down in the galley. A spring $N^7$ is arranged at a suitable point to depress the rule in the galley as soon as cam $N^5$ ceases to act. The plunger O has a head end $O'$ which fits closely transversely in the galley, and has a shank $O^2$ which extends rearward through an opening $D^7$ in the "pusher" D, so that the plunger can work through the pusher, and the pusher, work transversely of the plunger, without interference. On the rear end of shank $O^2$ is a round T-head $O^3$ which rests in one bifurcated end $P'$ on a bell crank lever P, which may be pivoted on shaft $N^3$, and on whose other end is a friction roller $P^3$ which runs upon the periphery of cam block I' in position to engage a short cam $P^2$ on the periphery of said block, by which the desired reciprocation is imparted to the plunger O at the proper time, the plunger being returned by means of a spring $O^4$, suitably arranged to retract it.

$o$ is a follower block in the galley below the rule against which the type are forced by the plunger. Said follower has a spring projected dog $o'$ which bites a groove in the side of the galley and prevents the follower springing out of the galley and holds it therein with sufficient friction to prevent its sliding out of the galley under pressure of the weight of the composed type.

*The space making and feeding mechanism.*—Above wheel A is secured a metal case Q formed of two metal plates, the rear one of which is channeled and recessed as hereinafter described to accommodate the space severing, and feeding devices and form the space and type guides. This case Q has a downward extension $Q^3$ which extends to and over slot $C'$ and which fits closely over the upper and outer side of wheel A as shown, and in this lower edge of the plate is a channel $Q^4$ through which the types delivered from belt B are directed into the slot $C'$. Substantially vertically above slot $C'$, in case Q is a channel $Q^5$ through which the spaces or leads are delivered into the lower end of channel $Q^4$ and in passing through channel $Q^5$ the leads pass between crimping rolls R, R, substantially as shown in my aforesaid application, which are mounted on shafts $R'$, $R'$, supported in bearings in a bracket casting $Z^3$ attached to the end of the type-reservoir or casing, behind case Q. The shafts $R'$ are intergeared, and one of them has a pinion $R^2$ on its rear end meshing with a pinion $S^2$ on a shaft $S'$ also journaled in the castings $Z^3$ above shaft $A'$, and driven from shaft $A'$ by a gear $A^6$ meshing with pinion $S^2$ as shown, so as to considerably lessen the speed of rolls R, R, compared with shaft $A'$.

The spaces, cut of proper length, are fed into channel $Q^5$ from a reservoir $Q^6$, also formed in case Q as shown, being ejected one at a time from said reservoir, as needed, by an ejector T which is guided in a suitable slot $Q^7$ in case Q, and is reciprocated back and forth by means of an arm $T'$ mounted on a stub shaft $T^2$ journaled in the case Q, on the outer end of which stub shaft is a short arm $T^3$ to which is pivotally-connected, the upper end of a pitman rod $T^4$ the lower end of which is connected, to a horizontal lever $T^5$ below the top of the stand on which the apparatus is mounted, one end of lever $T^5$ being pivoted to a stationary support, and the other having an upstanding link $T^6$ which rises above the top of the stand and is connected to a space board or key $T^7$, by depressing which, the lever $T^5$ is depressed, and a space ejected from reservoir $Q^6$ into the upper curved end of channel $Q^5$ just above the crimping rolls.

The spaces are delivered into the upper end of reservoir $Q^6$ through a channel $Q^9$, and in the present case the leads are cut from a continuous strip of soft metal Y drawn from a reel $Y'$ and led into the upper end of slot $Q^9$ and fed downward to the cutting devices by means of feed rolls U automatically operated as hereinafter described. These rolls U, U, occupy suitable recesses in case Q on opposite sides of channel $Q^9$ and are mounted on shafts $U'$ journaled in bearings in casting $Z^3$ as shown, which shafts are geared together by pinions $U^2$. On the outer shaft $U'$ is a gear $U^3$ which meshes with a segmental gear $U^4$ on a shaft $U^5$ upon which is a large gear $U^6$ meshing with a pinion $S^8$ splined on shaft $S'$. The gear $S^2$ is loosely mounted on shaft $S'$ and is locked thereto by a clutch. As shown I employ a friction clutch consisting of two plates $S^3$ splined on shaft $S'$ on opposite sides of gear $S^2$ and having friction plates $S^4$ of any suitable non-heating, wear resisting material or metal, such as raw-hide, Babbitt metal, &c., on their faces adjoining gear $S^2$. By means of adjustable nuts $S^5$, on the outer end of shaft $S'$ these plates $S^3$ are forced against gear $S^2$ with such power that the gear $S^2$ will rotate shaft $S'$, unless the latter be positively checked, and hence while gear $S^2$ rotates continuously the shaft $S'$ and the superimposed gearing, &c., driven from said shaft are operated only when the locking device hereinafter described is released. On the shaft $U^5$ just behind case Q is secured a disk $u$ having a shoulder $u'$ which is adapted to be engaged by the hooked end of a dog $u^2$ pivoted on the rear side of the casing, or to casting $Z^3$, and pressed against the periphery of disk $u$ by a spring $u^3$ as shown. So long as the dog bites shoulder $u'$ shaft $U^5$ cannot revolve. Consequently the ribbon feed rolls, the shaft $S'$ and the intermediate gearing is all stopped, though gear $S^2$ continues to rotate. On the outer end of shaft $U^5$, exterior to case Q is a cam disk V, which is adapted to engage with a roller on the shorter arm of a bell crank lever $V'$ and oscillate said lever which is pivoted at its bend on a stud on the case as shown, and its longer arm extends to a point above the reservoir $Q^6$ and engages a pin $V^2$ on a plate $V^3$ which is placed in a slot $q$ in the case Q just above the reservoir $Q^6$, pin $V^2$ projecting through a slot $q'$ in the front of case Q as shown.

On the upper end of plate $V^3$ is a pin $V^4$ which projects through a slot $q^2$ in the back of case Q and normally lies above the dog $u^2$ but when the plate $V^3$ moves to its lowest position pin $V^4$ strikes the dog $u^2$ and disengages it from disk $u$, whereupon the shaft $U^5$ and intermediate and connected gears are rotated by reason of the friction clutch between shaft $S'$ and gear $S^2$. The lower end of plate $V^3$ depends into the reservoir $Q^6$ and when there is a sufficient quantity of spaces in the reservoir to prevent the plate $V^3$ dropping to its lowest position the dog $u^2$ will remain in engagement with disk $u$, but as soon as the quantity of spaces is diminished sufficiently to allow the plate to drop to its full extent the dog will be disengaged and the making of spaces be resumed.

The means for severing the spaces from the lead ribbon is as follows: W is a female cutter die secured in a slot in case Q at one side of channel $Q^9$ and slightly above shaft $U^5$. $W'$ is the cutter reciprocating in a slot in plate $Q'$ directly opposite die W it being retracted by means of a spring $W^2$, and moved forward to sever a space by a tooth $W^3$ on shaft $U^5$, which engages a notch in the under side of cutter $W'$ as shown. The cutters may be formed to cut square ended spaces, or as shown to notch the ends of the spaces. The segmental gear $U^4$ has but a fraction of the number of teeth on gear $U^3$, so that the feed rolls only feed a length of ribbon Y sufficient for a space between the cutters for each revolution of shaft $U^5$. As shown gear $U^4$ has but one third as many teeth as gear $U^3$, and thus gear $U^3$ is intermittently rotated. The segmental gear enables the ribbon to be fed the proper length and then entirely stopped while the cutters are operating. In order to insure proper register of the teeth on gear $U^3$ with the segment $U^4$ a disk $w$, having three equidistant notches $w'$ in its periphery is fixed on the same shaft as gear $U^3$. The notches in disk $w$ are engaged by a spring actuated dog $w^2$ which is placed beside the plate $V^3$ and is guided in a slot in a block $q^5$ fastened to the plate $Q^2$ as shown. In the lower end of dog $w^2$ is a slot $w^3$ in which moves a pin $V^5$ on the upper end of plate $V^3$, so that when said plate $V^3$ drops to its lowest position the dog $w^2$ is disengaged from the disk $w$, simultaneously with the disengagement of dog $u^2$ from disk $u$.

The operation of the space making mechanism is as follows: As the spaces are ejected from reservoir $Q^6$ the plate $V^3$ drops by gravity, augmented by the weight of lever $V'$, until eventually it disengages catch $u^2$ from disk $u$ and simultaneously disengages dog $w^2$ from disk $w$. Immediately the shaft $U^5$ begins to rotate and segment $U^4$ engaging gear $U^3$ rotates the feed rolls U sufficiently to feed a length of ribbon Y, sufficient to form a space, between the cutters. Simultaneously cam V engages the short arm of lever $V'$ and oscillates it, causing it to lift plate $V^3$, whereupon dog $w^2$ engages a notch in disk $w$ and lock shaft $U'$ so that gear $U^3$ is stopped in position to properly mesh with segment $U^4$ at the next revolution of shaft $U^5$. The cam V through lever $V'$ keeps plate $V^3$ elevated while the cutters are severing the space from the ribbon, and the severed space drops into the reservoir beneath the plate $V^3$ while catch $u^2$ is ready to re-engage notch $u'$. After the space is severed and before segment $U^4$ again engages gear $U^3$ the cam V narrows allowing lever $V'$ to drop the plate $V^3$ and unless the space just made completes the normal number of spaces retained in reservoir $Q^6$ the plate $V^3$ will again disengage catch $u^2$ and dog $w^2$ and the shaft $U^5$ will make a second revolution and another space be fed in and severed, this operation being repeated until the last made space increases the height of the pile of spaces in reservoir $Q^6$ to such an amount that the plate $V^3$ cannot drop down far enough to disengage the catch $u^2$ and dog $w^2$ from their respective disks. Then the space ribbon feeding and cutting mechanisms will remain quiescent until so many spaces are ejected from the reservoir that the plate $V^3$ descends far enough to release the catch $u^2$ and dog $w^2$. Thus the mechanism for feeding and cutting the space ribbon is automatically controlled by the amount of spaces in the reservoir $Q^6$.

Having described one practical mode of automatically controlling the space-making mechanism I do not intend to confine myself thereto, as it would be easy to alter the clutches and the governing mechanism, or to make the action of the space-making devices dependent upon the will of the operator. Nor do I confine myself to the employment of mechanism for severing spaces from the ribbon or other blank on the machine as the spaces might be introduced, already cut, into the reservoir by hand.

For the purpose of automatically "justifying," a laterally compressible space is necessary, and the crimped space shown herein, and described in my aforesaid application for justifier, is the best form of space known to me. It is obvious however that the rotary or traveling type receiver is highly useful even where no automatic justifying is desired, and where ordinary non compressible spaces are used.

The operation of the machine is as follows: Shaft B being driven by any suitable motor continuous motion is transmitted to the type carrier belt and to the worm $J^2$ which is normally out of engagement with worm wheel $I^9$. Consequently the shaft I with all the parts operated therefrom is stationary, and the receiver is locked in such position that one of its channels $E'$ is registered with slot $C'$ and another with slot $C^2$. The operator then "composes" the matter by depressing the character and space keys in proper sequence as required by the matter being "set," and the types are successively delivered by the belt into channel $Q^4$ from which they enter slot $C'$ and are pushed therefrom into the channel $E'$ of the receiver by the reciprocating pusher D. When a space is needed the operator depresses key $T^7$ whereupon a space is ejected from reservoir $Q^6$ passed between the continuously and rapidly running crimping rolls R by which the space is corrugated and hastened through channel $Q^5$ into slot $C'$ whence it is forwarded into channel $E'$ in proper relation to the type. As the "composed" matter enters channel $E'$ it pushes the slide $E^2$ out of said channel into the casing F, until a sufficient number of characters have been pushed into the channel $E'$ to form a "line" of type. In practice the operator will be warned of this by an alarm, such as shown in my application for "type setter" above described, or of other suitable kind, none being shown herein nor being part of present invention. Thereupon the operator depresses key $k^2$, and immediately proceeds with his "playing" on the type-ejector keys to compose a new line. The depression of key $k^2$ however throws worm $Z^2$ into engagement with worm $I^9$, and immediately shaft I begins to rotate and makes one complete revolution, as described. Upon the first movement of shaft I cam J through lever $J^3$ and connections draws locking bolt $J^5$ out of engagement with the receiver, and keeps it out of engagement until cam $j$, through lever $j'$, and connections, as described, imparts a one-fourteenth revolution to receiver E, so as to shift the type filled channel E out of register with slot $C'$ and into register with slot $C^2$, simultaneously bringing another channel $E'$ into register with slot $C'$ so that the type which drop into slot $C'$ continuously are not crowded therein, but always find an outlet, the time required to shift the receiver so as to change the channels as described being so short that the type will not choke in the channels or slot $C'$. As soon as the receiver is given this partial rotation and locked, cam $I'$ through the described levers and connections begins to move block $G'$ toward the galley, and the block catching the projected slide $E^2$ forces the latter toward the galley, thereby ejecting the line of type from channel $E'$ through slot $C^2$ into the galley between the end of the plunger O, and the rule M, by which the alignment of the type is maintained as they move into the galley. This line of type it will be observed contains a number of yielding or laterally compressible spaces, and the length of the line is slightly greater than the width of the galley, the line being "over-spaced" as described in my application for "justifiers," above mentioned. The block $G'$ moves the slide $E^2$ outward so far that the line of type is compressed lineally, the spaces yielding to allow this, and forced wholly into the galley. Then the block $G'$ is retracted as described, and draws back the slide $E^2$ sufficiently to clear its end from slot $C^2$. After the line is in the galley cam $N^5$ through lever and rod $N^2$, and lever N, raises rule M above the top of plunger O, whereupon cam $P^2$ operates lever P and the plunger moves the justified line of type down in the galley and returns to normal position, and the rule M drops in readiness for the entrance of another line of type. The pin L thereupon strikes trip arm $k^4$ disengaging catch $k^3$ from arm $K^2$ and the worm $Z^2$ is thrown out of engagement with worm wheel $I^9$ and shaft I stops rotating, the pin L just clearing arm $K^2$ sufficiently to allow worm $Z^2$ to be again thrown into engagement with worm $I^9$ by depressing key $k^2$. All the operations described, to wit: the movement of a line of type into the galley, its justification, the retraction of the slide and block $G'$, the rising and lowering of the rule and the reciprocation of the plunger, &c., takes place for each rotation of shaft I, and while another line of type is being composed. Therefore two lines of type are being operated upon simultaneously in the machine, i. e., while one line is being composed the other is being justified and forwarded in the galley,—the operator simply having to depress a key ($k^2$) when he hears the signal of a line being completed and proceed with his "composition."

The practical value of the invention will be understood by those skilled in the art, and its time saving features apart from its automatic justification is an important and valuable merit of the invention.

I do not confine myself to the exact construction of parts shown herein, nor to the specific combination of parts described.

Having thus described my invention, what I therefore claim as new, and desire to secure by Letters Patent thereon, is—

1. The combination with mechanism for composing type, of a movable receiver, adapted to receive lines of type, and mechanism whereby while one line of type is delivered into the receiver, another previously "composed" line of type is removed therefrom, substantially as described.

2. The combination with mechanism for composing types of a receiver having channels each adapted to receive a line of type; mechanism whereby upon the completion of a line of type the receiver is shifted to bring an empty channel to the receiving point, and mechanism whereby the composed line is automatically delivered from the receiver at one point while such empty channel is being filled, substantially as described.

3. The combination with mechanism for composing type; of a line receiver having a number of channels, each adapted to contain a line of type, and mechanism whereby upon the filling of one channel said receiver is shifted so as to bring an empty channel to the type receiving point and simultaneously transfer the composed line out of the way, substantially as described.

4. The combination with mechanism for composing types, of a receiver having channels, each adapted to receive a line of type, located beside the composing mechanism so as to receive the assembled types into one of its channels, mechanism whereby upon the filling of one channel the receiver is shifted to bring an empty channel to the receiving point, and mechanism whereby the composed line is automatically delivered from the receiver at one point, while such empty channel is being filled, substantially as described.

5. The combination with mechanism for composing types, and a galley, of a movable receiver adapted to receive lines of type, from the composing mechanism and transfer them to the galley, and mechanism, substantially as described, whereby while one line of type is being moved into the receiver, a previously composed line is being transferred therefrom into the galley, substantially as described.

6. The combination in a type setting machine of mechanism for composing type, a rotary type line receiver having a series of type receiving channels, adapted to successively receive lines of type from the setting mechanism; with mechanism whereby said receiver is partly rotated upon the completion of a line of type, and mechanism whereby a previously formed line of type is ejected from the receiver during the entrance of another line therein, substantially as described.

7. The combination of mechanism for composing type, a rotary type-line receiver having a series of type receiving channels each adapted to receive a line of type; with key controlled mechanisms, whereby when a line of type is composed, upon depressing such key, the receiver is partly turned so as to bring an empty channel to the receiving point, and while such channel is being filled, the previously filled channel is emptied, substantially as described.

8. The combination of mechanism for composing type, a rotary receiver having a series of longitudinal channels in its periphery, each adapted to receive a line of type; a key controlled mechanism whereby the receiver is partly rotated upon the completion of a line; and mechanism whereby the completed line of type is automatically ejected from the receiver during the formation of another line of type in another channel thereof, substantially as described.

9. In a type setting machine the combination with a line-receiver, of means for moving said receiver, means for ejecting a composed line therefrom, and a single key and connections whereby both said means are put in action upon the depression of the key, substantially as described.

10. In a type setting machine the combination with a movable line receiver; of mechanism for locking and unlocking said receiver; mechanism for moving said receiver a certain distance while unlocked; mechanism for ejecting a composed line of type therefrom, and a single key and connections whereby said mechanisms are controlled, substantially as described.

11. In combination with a type setting machine and a receiving galley, of a receiver, mechanism for moving it intermittently; mechanism for ejecting a composed line of type from the receiver into the galley, while another line of type is being moved into the receiver, and a single key and connections controlling both said mechanisms, substantially as described.

12. The combination in a type setting machine of a slot into which the types are successively delivered from the type-holder; means for pushing the types out of said slot; a receiver having a plurality of type-receiving channels, arranged beside said slot, means whereby the channels in the receiver are successively registered with said slot and receive type therefrom means whereby when a line of type is pushed into one channel the receiver is shifted so as to bring another channel into register with the slot, and transfer the completed line to a delivery point, and mechanism whereby the completed line of type is automatically transferred from the receiver during the forwarding of another line of type therein, substantially as described.

13. In a type setting machine the combination of a type receiver having a plurality of type receiving channels, means whereby lines of type are pushed into the channels of the receiver successively, and mechanism whereby while one channel of the receiver is being filled another type filled channel is being emptied, substantially as specified.

14. In a type setting machine the combination of a galley, a type receiver having a plurality of type holding channels into which the types as composed are forwarded, mechanism whereby upon the filling of one channel the receiver is shifted to bring up an empty channel; and mechanism whereby during the filling of one channel the type in a previously filled channel is automatically transferred into the galley, substantially as and for the purpose described.

15. In combination with a type setting machine; a type line receiver, mechanism for intermittently moving said receiver, mechanism for locking it when shifted; mechanism for ejecting a composed line of type from the receiver and simultaneously lineally compressing said line, and a single key and connections controlling said mechanism, substantially as described.

16. In a type setting machine the combination with a type line receiver, and a galley, of mechanism for moving said receiver intermittently so as to transfer a composed line of type from the receiving to the delivery point; mechanism for ejecting the composed line from the receiver into the galley, mechanism whereby the composed line is subsequently moved down in the galley out of the way of an incoming line, and a single key and connections whereby all said mechanisms are controlled, substantially as and for the purpose set forth.

17. In a type setting machine the combination of a galley, a plunger therein, and a movable rule; with a type line receiver, mechanism for moving said receiver intermittently, mechanism for ejecting a composed line from said receiver into the galley between the rule and plunger; mechanisms for raising said rule and simultaneously moving the plunger to push the line down in the galley and then to retract plunger and lower rule; and a single key and connections whereby all said mechanisms are controlled, substantially as described.

18. In a type setting machine the combination with a rotary line receiver, means for rotating it, and means for ejecting a composed line therefrom, both driven from one shaft; with a key, and means substantially as described whereby said shaft is given one revolution only upon the depression of said key, substantially as described.

19. In a type setting machine the combination with a rotary line receiver, means for rotating it step by step, and means for unlocking and locking it before and after the action of the rotating mechanism; means for ejecting a composed line therefrom; all said means being operated once from and during one revolution of a single shaft; with a key and means substantially as described whereby said shaft is given one revolution only for each depression of said key, substantially as described.

20. In a type setting machine the combination with a galley a rotary type line receiver, mechanism for rotating said receiver step by step, mechanism for ejecting a composed line of type from the receiver into the galley, and mechanism for moving the composed line down in the galley; all said mechanisms being operated once from, and during the revolution of, a single shaft; with a key, and means substantially as described whereby upon the depression of said key said shaft is caused to rotate once, substantially as described.

21. In a type setting machine, the combination of mechanism for composing type and compressible spaces in line, a receiver having a plurality of type-receiving channels adapted to successively receive enough types as composed to form a line when justified, a receiving galley, and mechanism whereby as type to make one line are being composed and forwarded into one channel of the receiver, a previously formed line of type is ejected from the receiver and automatically justified by laterally compressing the line, thereby flattening the yielding spaces, substantially as described.

22. The combination of mechanism for composing type and laterally compressible spaces in line, with a key controlled power actuated mechanism whereby the lines of type are automatically justified by lineal compression, substantially as described.

23. The combination of mechanism for composing type and laterally compressible spaces in line, and mechanism for transferring enough composed matter to form a line out of the way of the type setting devices, with power actuated mechanism whereby as one line of type is being composed a previously composed line of type is automatically justified by lineal compression, substantially as described and for the purpose set forth.

24. The combination of mechanism for composing type and spaces in line, mechanism for forming laterally compressible "spaces" and delivering them as needed to the composing devices during the setting operation, and key-controlled mechanism, whereby when enough types and spaces have been set to form a line, such matter is removed and automatically justified by lineal compression, without stopping the setting operation, substantially as described.

25. The combination of mechanism for composing type and compressible spaces in line, a rotary receiver having a series of channels adapted to successively receive a line of matter as composed; and mechanism whereby upon the depression of a single key, first, the receiver is shifted so as to transfer the type-filled slot from the type-receiving point; second, the line of type ejected laterally from the receiver; third, such line justified by lineal compression permitted by the yielding of the spaces, these several operations taking place while a new line of type is being forwarded into another channel of the receiver, substantially as described.

26. The combination in a type setting machine of mechanism for composing type, a slot into which the types are successively delivered as composed, a pusher for ejecting type from said slot; a galley, a movable rule and plunger therein; a receiver having a plurality of type receiving channels adapted to successively register with said slot, and with the space between the plunger and rule in the galley with mechanism, controlled by a single key for first, shifting the receiver so as to transfer a type-filled channel from register with the slot into register with the space between rule and plunger and to simultaneously bring an unfilled channel into register with said slot; second, for ejecting the line of type from the receiver into the galley between the rule and plunger, and, third, for raising the rule and moving the line of type down in the galley; all said operations taking place automatically during the composition of a succeeding line of type, substantially as described.

27. In a type setting machine the combination of a galley, a plunger therein, and a movable rule: a rotary type-line receiver, mechanism for rotating said receiver step by step, mechanism for locking said receiver after it is shifted, mechanism for ejecting a composed line from said receiver into the galley between the rule and plunger; mechanisms for withdrawing the rule and simultaneously moving the plunger to push the line down in the galley and then to retract plunger and replace rule; and a single shaft for actuating all said mechanisms; with a key and connections whereby said shaft is rotated once for each depression of the key, substantially as described.

28. The combination in a type setting machine of mechanism for composing type, in line, a cylindrical type line receiver into which the type are moved as composed, and a key controlled means whereby upon the depression of such key the receiver is partly rotated upon the completion of a line, to transfer such line out of the way, substantially as described.

29. In a type setting machine the combination with the composing mechanism, of a line receiver having a series of channels each adapted to receive a line of type from the composing devices; slides fitted in said slots and ejected by the incoming type, and mechanism for moving said receiver upon the completion of a line of type so as to transfer the line to a delivery point and simultaneously bring a new channel to the receiving point, and means for pushing the ejected slide back into its channel thereby ejecting the composed line therefrom, substantially as described.

30. In a type setting machine, the combination with the composing mechanism; of a line receiver having a series of type receiving channels, a slide in each channel adapted to be moved outward by the incoming type, mechanism whereby, after the setting of a line and its transfer (by moving the receiver) to a delivery point, said slide is pushed inward to eject the line wholly from the channel, and means whereby the slide is partially retracted after the line is ejected, substantially as described.

31. In a type setting machine the combination of the composing mechanism, and a galley having a slot for the introduction of type; with a movable receiver having a series of channels each adapted to successively receive a line of type from the composing devices and then register with the inlet slot of the galley, a series of slides in said channels, and means whereby said slides are successively moved inward so as to eject the lines of type from the channel into the galley through said slot, and means for withdrawing such slide so as to free its end from the slot, substantially as described.

32. The combination of the rotary channeled receiver, with the slides fitting in the channels, and means for moving said slides to eject the type in the channels, substantially as described.

33. The combination of the rotary channeled receiver, the slides fitted in its channels, and the inclosing casing having a cut out portion exposing two channels of the receiver, substantially as described.

34. The combination of the casing the rotary channeled receiver therein, and the slides fitted in the channels of the receiver, with the push block within the casing adapted to engage the slides substantially as described.

35. The combination of the casing the rotary channeled type receiver therein, the longitudinally movable block in said casing and means whereby said block ejects the lines from the receiver, substantially as described.

36. The combination of the rotary channeled receiver, the slides in the channels thereof, the block movable toward and from the receiver adapted to force projected slides, back into the channels thereby ejecting the type therefrom, and the dog carried by said block adapted to engage and slightly pull out the slides when the block moves outward, substantially as described.

37. The combination of the rotary channeled receiver, the slides in the channels thereof, the block and dog for actuating said slides, and the flanged casting for keeping the slides normally in position, substantially as described.

38. The combination of the casing, the rotary receiver in one end thereof and the slotted casting in the other end; with the movable block guided in said slotted casting and means whereby said block is caused to eject lines of type from the receiver, substantially as described.

39. The combination of the casing, the rotary receiver in one end thereof, and the slotted casting in the other end thereof, the movable block guided in said slotted casting adapted to eject lines of type from the receiver and mechanism substantially as described for alternately partly rotating the receiver and reciprocating said block, substantially as set forth.

40. The combination of the casing the rotary receiver in one end thereof and the slotted and flanged casting in the other end thereof; the slides in the channels of the receiver, the block in the slot of the casting; and a dog carried by said block adapted to engage the slides during the initial outward movement of the block; with mechanism substantially as described whereby the receiver is first partly rotated, then the block moved so as to engage a slide and eject a line of type from the receiver, substantially as described.

41. The combination of the galley, the casing attached thereto, the slotted casting within said casing, the channeled receiver within the casing next the galley, the slides in its channels; the rod passing axially through said receiver into the casing, means for reciprocating said rod, and a block on the inner end of the rod guided in said slotted casting and adapted to engage projected slides and force them back into the receiver thereby ejecting the type, substantially as described.

42. The combination of the galley, the casing attached thereto, the slotted casting within said casing, the channeled receiver within the casing next the galley, the slides in its channels; the rod passing axially through said receiver into the casing, means for reciprocating said rod, and a block on the inner end of the rod guided in said slotted casting and adapted to engage projected slides and force them back into the receiver thereby ejecting the type, and means for intermittently rotating said receiver step by step alternating with the reciprocations of said block, and means for locking the receiver after it is rotated, substantially as described.

43. The combination of the galley having adjoining receiving and inlet slots in its side, means for delivering types to be composed into the receiving slot, and means for pushing the type out of said slot; with a rotary receiver journaled beside the galley having longitudinal channels adapted to register successively with the said slots; longitudinally movable slides in said channels, adapted to be forced outward by the incoming type, and means whereby the projected slides are forced inward at the proper time to eject the composed types, from the receiver through the inlet slot into the galley, substantially as described.

44. The combination of the galley the transverse reciprocating pusher, and the longitudinal movable plunger working through the pusher substantially as described.

45. The combination of the galley, the slotted pusher reciprocating transversely of the galley, the longitudinal movable plunger playing through said pusher and the vertically movable rule, independent of the plunger; with means for operating these parts at the proper times, for the purpose and substantially as described.

46. The combination of the galley having adjoining receiving and inlet slots in one side, a reciprocating pusher for ejecting types from the receiving slot, and a reciprocating plunger and vertically movable rule at opposite sides of the inlet slot; with the rotary galley having a series of type receiving channels adapted to successively register with the galley slots; the slides in said channels, and means for actuating the slides so as to eject composed lines of type from the receiver into the galley through the inlet slot, and mechanism whereby the pusher, plunger, rule and receiver, are operated substantially in the manner and for the purpose specified.

47. The combination of a type line receiver, means for moving it, and for ejecting type therefrom operated once for each revolution of shaft; with a worm gear on said shaft, a continuously rotated worm adapted to engage said worm gear, a key lever, and connections, substantially as described, whereby said worm is thrown into engagement with the shaft, and automatic mechanism whereby said worm is disengaged from said gear when said shaft makes one revolution, substantially as described.

48. The combination with a shaft, a worm gear thereon, a worm adapted to engage said gear, mounted on a swinging bracket, means for holding said worm normally out of engagement with said worm-gear, and means for continuously rotating said worm; with a rock shaft, a lever thereon engaging said bracket, and a key lever for rocking said shaft whereby said bracket is swung to throw the worm in engagement with the worm-gear, and means for holding said bracket to retain the worm in engagement with the gear until said shaft makes a complete revolution, substantially as described.

49. The combination of a shaft, a worm-gear thereon, a continuously rotated worm adapted to engage said gear and carried by a swinging bracket; a rock shaft, a lever thereon engaging said bracket, a key lever for rocking said shaft to throw the worm into engagement with the gear, a catch for locking the bracket in such position, and the trip-pin mounted on the shaft adapted to disengage the catch when the shaft makes a complete revolution, substantially as described.

50. The combination with the composing devices, a movable type line receiver having a series of channels into which the types are delivered and means for ejecting the lines of type from the channels operated by a reciprocating rod; with a lever for reciprocating said rod, another lever vibrated by a cam and a breakable connection between said levers, for the purpose and substantially as described.

51. The combination of the rotary type-line receiver, its slides, and the movable block for pushing said slides; with the rod attached to said block, the lever for reciprocating said rod, the lever operated by a cam, and the breakable connection between said levers, for the purpose and substantially as described.

52. The combination of the galley, the grooved guides at each side thereof, the rule moving in said guides, the bell crank lever for raising and lowering said rule, a cam-actuated vibrating lever, and the spring controlled rod connecting said lever to the free arm of the bell-crank lever, substantially as and for the purpose described.

53. The combination of the rotary type-line receiver the ratchet on the end thereof, the oscillating dog engaging said ratchet, and a reciprocating pin or plate for locking the receiver: with a shaft, the cams thereon, and the oscillating levers operated by said cams and respectively connected to and operating the dog and the locking pin, whereby the receiver is partly rotated during the moment the locking pin is disengaged therefrom, substantially as described.

54. The combination of the reciprocating pusher, the oscillating spring controlled lever for vibrating it, and the annular cam for rocking said lever, constructed and arranged, substantially as described.

55. The combination of the galley, the plunger therein, having a T-headed shank, with the pivoted bell crank lever having one end bifurcated and slotted to engage the T-head of the plunger, and the other end carrying a friction roller, and a cam engaging said roller substantially as described.

56. In a type setting machine the combination of a space reservoir with means for making spaces and supplying them to the reservoir automatically controlled by the amount of spaces therein, substantially as described.

57. The combination of mechanism for feeding a "space" ribbon and mechanism for cutting the same into proper lengths, a "space" reservoir in which the severed spaces are collected, and mechanism (controlled by the number of spaces in said reservoir) whereby the operation of the feeding and cutting mechanism is automatically regulated, substantially as described.

58. The combination with means for feeding and cutting spaces from a strip or ribbon and a reservoir in which the spaces are collected; and means for locking the feeding and cutting mechanisms with a vibrating plate resting on the spaces in the reservoir adapted to drop as the spaces are removed and eventually disengage the lock thereby releasing the feeding and cutting mechanisms, means for raising said plate upon the severance of each space until the latter drops into the reservoir, whereby the making of spaces is automatically controlled, substantially as described.

59. The combination of the space-ribbon feed rolls, and cutter, the shaft for operating the cutter, the gearing for driving the feed rolls from said shaft, and spring actuated dog for locking said shaft; with the vertically movable plate, adapted to disengage said dog from the shaft when it drops to its lowest position, and the oscillating lever actuated by a cam on said shaft for vibrating said plate substantially as described.

60. The combination of the ribbon feed rolls, the gear, and notched disk on the shaft of one roll; and the reciprocating cutter, its driving shaft, and the segment on said shaft engaging the gear on the cutter shaft whereby the feed rolls are intermittently operated to feed a proper length of ribbon before the cutter operates; with the spring controlled dog engaging said disk to lock the feed rolls after each partial revolution, substantially as described.

61. The combination of the ribbon, feeding and cutting mechanisms, the shaft for driving them, the notched disk and the cam on said shaft, the spring actuated dog engaging said disk for locking the shaft, and the bell crank lever rocked by said cam; with a space reservoir into which the severed spaces are directed; and a movable plate above and resting on the spaces attached to said bell crank lever, and having a pin adapted to disengage the dog from the disk when the plate drops to its lowest position, substantially as described.

62. The combination of the ribbon feed rolls, the gear and notched disk on one roll shaft, the reciprocating cutter, the toothed shaft for operating said cutter, the segment thereon adapted to engage said gear; the notched disk on the latter shaft and the locking dog engaging said disk, and a cam on the outer end of said toothed shaft; with the space reservoir; the plate depending therein; adapted to engage and release the dog; the vibrating bell crank lever operated by said cam for reciprocating said plate: a spring controlled dog engaging the notched disk on the roll shaft and the pin on said plate for disengaging the dog from said disk, substantially as described.

63. The combination of the space ribbon feed rolls, the gear thereon, the segmental gear for operating said feed rolls, the cam disk on the shaft carrying the segmental gear, and a friction drive for said shaft; with cutting devices operated by said shaft; a locking device for said shaft, and mechanism for releasing said locking device substantially as described.

64. The combination of the space ribbon feed rolls, and cutting device; the shaft for operating said cutter, gearing between said shaft and the feed rolls, and a friction drive for said shaft; with a device for locking said shaft a space reservoir, a plate resting on the spaces in said reservoir adapted to disengage said locking device from the shaft when it drops to a predetermined point, due to the withdrawal of spaces from the reservoir, and means for raising said plate at each operation of the feeding and cutting devices, substantially as described.

65. The combination of the space ribbon feed rolls, the gear thereon, the segmental gear for operating said feed rolls, the cam disk on the shaft carrying the segmental gear and a friction drive for said shaft; with a cutter operated by said shaft; a device for locking said shaft, a cam on said shaft, a bell-crank lever operated by said cam and the plate reciprocated by said bell-crank lever adapted to release the locking device when it drops to a certain point, substantially as described.

66. In a type setting machine the combination of a space reservoir, a space ejector, and crimping rolls located between the reservoir and the composing channel, by which the space is corrugated on its way to the composing channel, substantially as described.

67. In a type setting machine the combination with a space reservoir, mechanism controlled by the number of spaces in the reservoir and constructed substantially as described for making spaces from a continuous strip of soft metal; means for ejecting the spaces successively from the reservoir, and crimping rolls adapted to catch the ejected space and crimp it as it travels to the composing race-way, substantially as described.

68. The combination of the shaft $U^5$, gear $U^4$, cam V, lever V', plate $V^3$, disk $u$, catch $u^2$, rolls U. U. gear $U^3$, disk $w$, and catch $w^2$, all constructed and arranged to operate substantially as described.

69. The combination of the shaft B, belt wheel A, and belt $B^2$ the galley, the pusher, the receiver E, casing F, block H, rod G, block G', slides $E^2$, shaft I, the key controlled worm gearing for driving the same from shaft B cams I' J, J', the plunger, the rule, and the devices for operating the plunger, rule, line compressing, and receiver rotating devices from the cams on shaft I all substantially as described.

In testimony that I claim the foregoing as my own I affix my signature in presence of two witnesses.

PAUL F. COX.

Witnesses:
JAMES R. MANSFIELD,
CHAS. L. DU BOIS.